(12) United States Patent
Ngalle

(10) Patent No.: US 8,201,251 B2
(45) Date of Patent: Jun. 12, 2012

(54) SOFTWARE APPLICATION VERIFICATION METHOD AND SYSTEM

(75) Inventor: Cyrille Ngalle, Bangalore (IN)

(73) Assignee: NXP B.V., Eindhoven (NL)

( * ) Notice: Subject to any disclaimer, the term of this patent is extended or adjusted under 35 U.S.C. 154(b) by 486 days.

(21) Appl. No.: 12/063,675

(22) PCT Filed: Aug. 10, 2006

(86) PCT No.: PCT/IB2006/052767
§ 371 (c)(1),
(2), (4) Date: Jun. 22, 2010

(87) PCT Pub. No.: WO2007/020574
PCT Pub. Date: Feb. 22, 2007

(65) Prior Publication Data
US 2010/0263051 A1      Oct. 14, 2010

(30) Foreign Application Priority Data

Aug. 12, 2005   (EP) ..................................... 05300663

(51) Int. Cl.
*G06F 11/00*   (2006.01)
*G06F 12/14*   (2006.01)
*G06F 12/16*   (2006.01)
*G08B 23/00*   (2006.01)

(52) U.S. Cl. .................... 726/23; 726/26; 726/1; 726/4; 726/25; 713/175; 713/176; 455/418; 455/419; 455/420; 455/423; 455/425; 711/118; 717/174; 717/175; 717/176; 717/178; 705/64; 705/67; 705/78; 705/79

(58) Field of Classification Search ...................... 726/30
See application file for complete search history.

(56) References Cited

U.S. PATENT DOCUMENTS
5,668,876 A * 9/1997 Falk et al. ..................... 380/271
(Continued)

FOREIGN PATENT DOCUMENTS
JP           2001-043081 A      2/2001
(Continued)

OTHER PUBLICATIONS

Verisign Inc., Code Signing Process (Found at: http://www.verisign.com/products-services/security-services/code-signing/digital-ids-code-signing/how-it-works.html) Aug. 3, 2005.
(Continued)

*Primary Examiner* — Nathan Flynn
*Assistant Examiner* — Bryan Wright

(57) ABSTRACT

A method for verifying a software application to a user of a device such as a mobile phone. The device receives (102) the software application, for example a Java ME MIDlet, and checks (104) a signature associated with the software application. Where the signature is recognized, the phone indicates (108) this status to the user, for example by displaying the familiar padlock icon. The mobile phone then establishes (110) a secure code known only to the user and a trusted entity, the entity being for example the manager of the Java ME environment. The device identifies (114) the software application to the trusted entity which then checks (116) the status of the software application. If the status is verified, the entity sends (118) the status to the device; which in turn indicates (120) the secure code to the user, for example as an additional displayed number, pictogram or the like.

20 Claims, 3 Drawing Sheets

U.S. PATENT DOCUMENTS

| | | | |
|---|---|---|---|
| 2002/0144140 A1 | 10/2002 | Ellison et al. | |
| 2004/0125955 A1* | 7/2004 | Murray | 380/249 |
| 2005/0033987 A1* | 2/2005 | Yan et al. | 713/201 |
| 2005/0039043 A1* | 2/2005 | De Boursetty et al. | 713/200 |

FOREIGN PATENT DOCUMENTS

| | | |
|---|---|---|
| JP | 2004-297711 A | 10/2004 |
| JP | 2004-318442 A | 11/2004 |
| WO | 98/33296 A1 | 7/1998 |
| WO | 9833296 A1 | 7/1998 |
| WO | 2004/066580 A1 | 8/2004 |

OTHER PUBLICATIONS

"Digital Cellular Telecommunications System (Phase 2+) (GSM)" ETSI Standards, European Telecommunications Standards Institute, Sophia-Antipo, FR, vol. 3-T2, No. V420, Jun. 2001, XP014007542 ISSN: 0000-0001, paragraphs [08.4], [8.11].

* cited by examiner

SOFTWARE APPLICATION VERIFICATION METHOD AND SYSTEM

The present invention relates to software enabled devices, and in particular to verifying the security of software applications run thereon.

Software and macro signing is based on the same public key cryptography system as used in Web site and personal digital certificates. As to an example, using the VeriSign Inc., Code Signing process (see http://www.verisign.com/products-services/security-services/code-signing/digital-ids-code-signing/how-it-works.html as read on Aug. 3, 2005), first, generate a private/public key pair. Then apply for a Code Signing Digital ID with VeriSign by submitting the public portion of the key for certification, along with documentation to prove your identity. Once VeriSign has verified your identity, you will be issued a Digital ID. Then sign applets, plug-ins, or macros with your Digital ID. When your signed object and files are downloaded, they contain a copy of your certificate so that recipients are able to identify you as the author. Post your signed code or software on your site so that customers can purchase and download them as normal. Customers download your applet, code object or macro. Their browser verifies the signature on the code. The customer is able to view the certificate in order to identify the developer who wrote the code.

A similar process to the above exists for MIDlet applications intended for embedded products operating in the Java Micro Edition (Java ME, previously also known as J2ME) environment. The security model (MIDP 2.0) for Java ME recommends to visually indicate to the product user only "Trusted" MIDlets (that is, MIDlets that have been signed by a Certificate Authority). Due to the nature of MIDlet applications, it is possible that such visual indication may also be provided by an untrusted MIDlet, thereby circumventing the present security model.

It is an object of the present invention to improve on the known prior art.

According to a first aspect of the present invention, there is provided a method for verifying a software application to a user of a device, comprising:
 receiving the software application;
 checking a signature associated with the software application;
 where the signature is issued by a recognised authority, indicating this status to the user;
 establishing a secure code known only to the user and a trusted entity;
 identifying the software application to the trusted entity;
 checking the status of the software application by the trusted entity; and
 where the software application status is verified:
  sending the status to the device; and
  indicating the secure code to the user.

Advantageously, the invention recognises the risk that un-verified applications can be made to appear trusted to the end user. To reduce this risk, the invention applies a further independent verification in conjunction with a trusted entity, such as the entity which manages the application operating environment.

A further advantage is that additional resources at the user device are not usually required—the independent verification process being controlled by the trusted entity, in particular the secure algorithm for generating the, user specific, secure code. For mobile phones the SMS capability is a suitable communications link to send the secure code to the end user.

A yet further advantage is that the secure algorithm can be changed from time to time to further enhance security, in the event that the original algorithm was compromised or as part of a periodic updating process. The consequent updated secure code is then sent to the user device. This updating process can be independent of any input from the user, for example by using the originally supplied PIN.

According to a second aspect of the present invention, there is provided a system for verifying a software application, the system comprising:
 a user device;
 a software applications server;
 a trusted entity server;
 a first communications link operable to communicate with the software applications server;
 a second communications link operable to communicate with the trusted entity server;
 the user device further comprising a processor, a display, a user interface, program memory, data memory and interfaces to connect to respective first and second communications links; the processor operable to:
  receive the software application from the software applications server using the first communications link;
  check a signature associated with the software application;
  where the signature is issued by a recognised authority, indicate this status to the user by means of the user interface or display;
  using the second communication link,
   establish a secure code known only to the user and the trusted entity; and
   identify the software application to the trusted entity; and
  indicate, by means of the user interface or display, the secure code to the user where the software application status is verified; and
 the trusted entity server is operable to:
  check the status of the software application; and
  where the software application status is verified, send the status to the device.

An embodiment of the invention will now be described, by way of example, with reference to the accompanying drawings, in which.

In the following, an example embodiment of the present invention is to described by reference to MIDlets software applications intended to run in a Java ME environment on a mobile phone.

Figure 1:
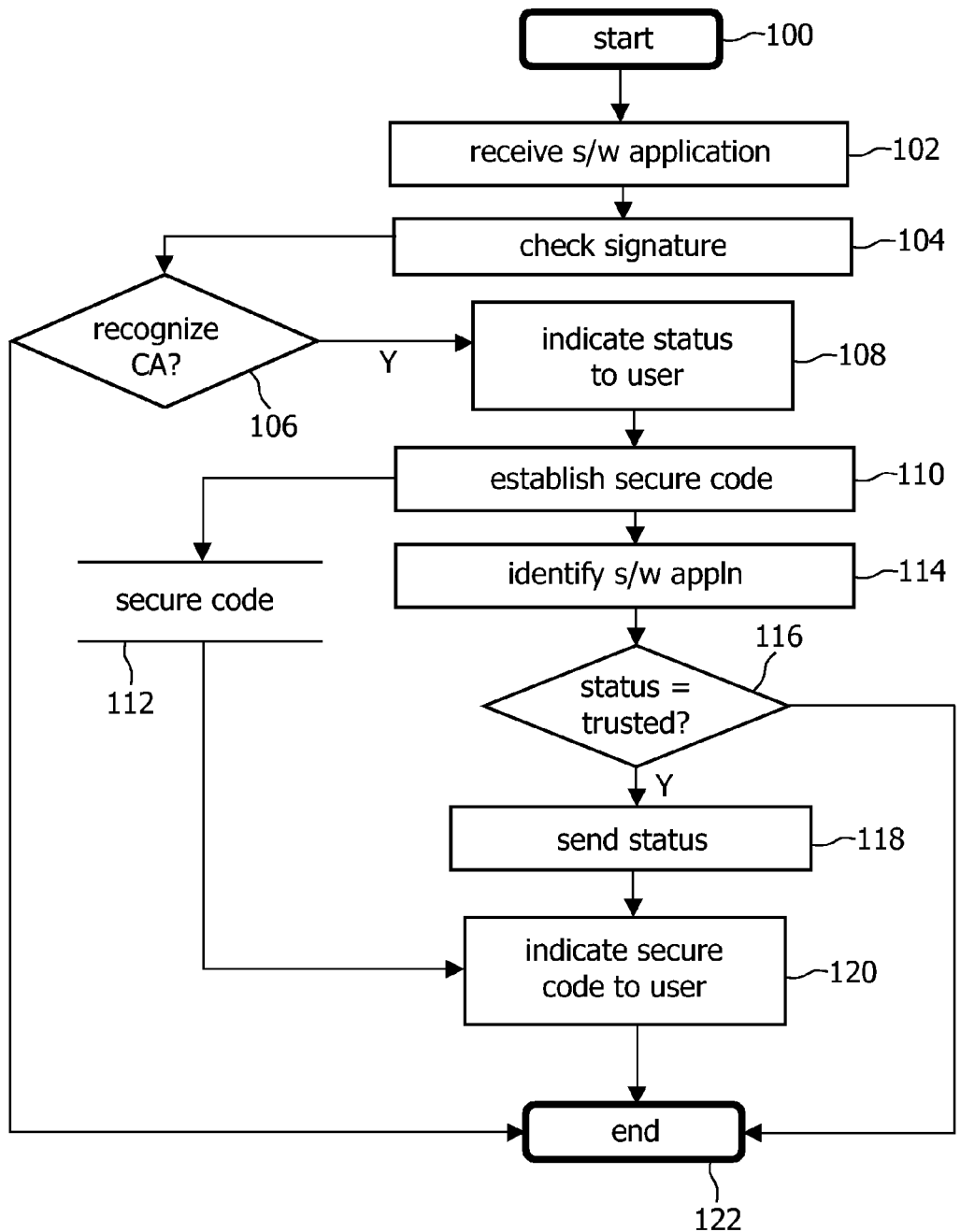
FIG. 1 is a flowchart of a method for verifying a software application to a user of a device.

FIG. 1 shows a flowchart of a method for verifying a software application to a user of a device. The method starts at 100 and at 102 a software application is received by the device. Example applications include MIDlets, applets, plug-ins, macros, etc. The device checks 104 the signature associated with the software application using conventional means as known to the person skilled in the art. Where it is recognised 106 the signature is issued by a recognised certificate authority, this status is indicated 108 to the user, for example by displaying a conventionally recognised icon, such as a padlock. Clearly, certain embedded products may make the entire display area available to applications, thereby allowing applications which either do not have a certificate or have a certificate from a non-recognised certificate authority to potentially also suggest to the user that they are trusted by rendering on the display a conventionally recognised icon, for example a padlock.

The method of the present invention overcomes this disadvantage by providing further independent verification of trusted applications as described in the following. A secure code 112 is established 110 which is known only to the user and a trusted entity, such an entity being for example the managing authority for the software operating environment of the device—e.g. for Java ME based devices, Sun Microsystems Inc., or one of its authorised agents. The secure code may be established each time an application needs to be verified; preferably, for improved user convenience, the code is established on first initialisation of the device. An example method to establish a code is now described in respect of a mobile phone device. The user inputs any suitable PIN number (e.g. the PIN number of the mobile phone). The mobile phone then forwards the inputted PIN to the trusted entity which then calculates a secure code in dependence on the PIN, the calculation being performed using a secure algorithm which is under the control of the trusted entity. Advantageously, should the secure algorithm become compromised, for example become known outside the confines of the trusted entity, then a new to secure algorithm can be deployed, without necessarily requiring the user to enter a further PIN, which calculates a new secure code in dependence on the supplied PIN. This makes the solution of the present invention very convenient from the user perspective. Once the secure code has been calculated, it is then sent to the device, in the example case of the mobile phone, preferably the secure code is sent via SMS as this is secure from access by developers of the above mentioned software applications.

The method then continues with the trusted entity identifying 114 the software application. For example, the user device (e.g. mobile phone) forwards the identity of the software application to the trusted entity via for example an SMS message. Having knowledge of the identity of the software application, the trusted entity checks 116 the status of the software application. If it is a trusted application, the trusted entity will send 118 the trusted status to the end user device, for example using an SMS message. An alternative method is to forward the (good/not good) result of the check to the end user device, however, such a result may be potentially vulnerable to malicious modification at the device. The trusted status received at the device is then used to indicate 120 the secure code to the end user, for example as a recognisable displayed item, an audible report to the user, etc. The method ends at 122.

Figure 2:
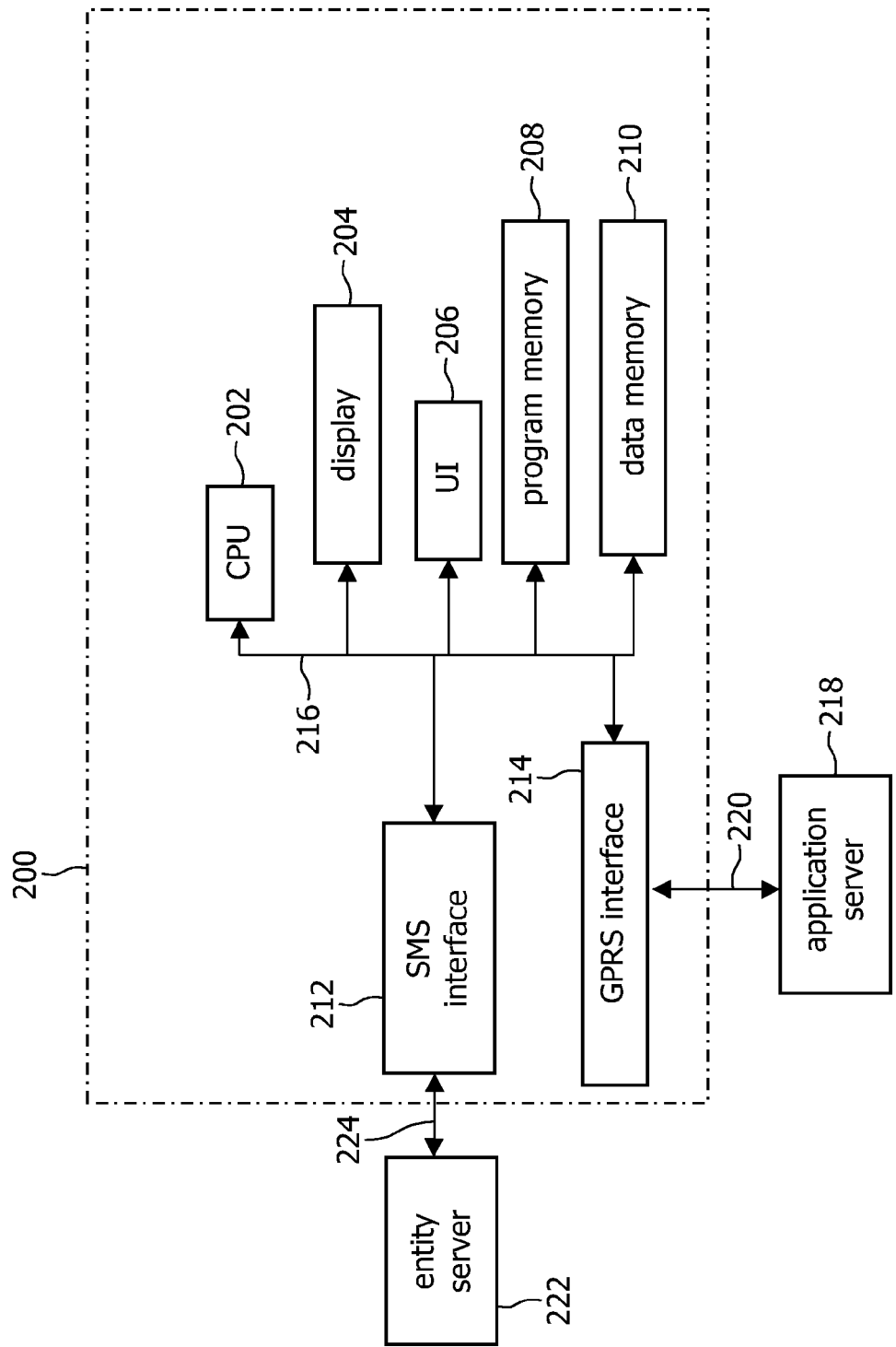
FIG. 2 is a schematic diagram of a system for verifying a software application comprising a mobile phone.

FIG. 2 shows a schematic diagram of a system for verifying a software application comprising a mobile phone. The system comprises mobile phone 200, a software applications server 218; a trusted entity server 222; a General Packet Radio Service (GPRS) link 220 to communicate between the mobile phone and the software applications server and a Short Message Service (SMS) link 224 to communicate between the mobile phone and a server of the trusted entity. The referred to links are logical links in that they may access a common physical medium, for example the GSM radio interface. In general, for an embedded device, any suitable wired or wireless links may instead be used, according to design preference or usage domain of the device; examples include Ethernet, IrDA, RS232, Bluetooth, Wi-Fi and ZigBee. The trusted entity has been discussed earlier; in this example it is taken to be to the entity responsible for managing the Java ME environment contained in program memory 208 of the phone, which in turn directs the operation of the CPU 202 of the phone. In addition to program memory 208 and CPU 202, the mobile phone 200 further comprises a display 204, a user interface 206, data memory 210 and interfaces 212, 214 to respective SMS link 224 and GPRS link 220, all interconnected by data bus 216 as is known in the art.

In operation, the mobile phone 200 receives a software application from the software applications server 218 using the GPRS communications link 220. Under control of the Java ME environment, the software application is routed by the CPU 202 via bus 216 to be stored in data memory 210. The CPU 202 then checks a signature associated with the software application. If the signature has been issued by a recognised authority, for example VeriSign, the CPU arranges to indicate this fact to the user by means of the display, for example by showing a padlock icon. This completes the first stage of verification.

Then the CPU 202, under control of the Java ME environment, establishes (if not already done so) a secure code in conjunction with the trusted entity. A PIN is obtained from the user, either entered by the user using the user interface 206 (e.g. keypad) when prompted, or using an existing PIN (e.g. the main PIN of the mobile phone). The obtained PIN is then sent via the SMS interface 212 and link 224 to the trusted entity server 222. In turn, the trusted entity server 222 calculates (using a secure algorithm and the PIN) a secure code and returns this code via the SMS link 224 to the mobile phone. The secure code may be a number code or any other user recognisable code, for example an icon, pictogram or the like. Preferably, the code is unique to the user, for example having been derived from both the inputted PIN and the device ID (e.g. GSM ID, phone number, etc.).

Next, the CPU, again using the link 224 to the trusted entity, provides identification data obtained from the received software application. The trusted entity checks the status of the identified software application and, where the software application's status is verified, sends the status to the mobile phone 200, again using the link 224.

Once the mobile phone receives the verified status, the CPU 202 indicates (e.g. on display 204) the secure code to signal the user that the status of the software application is verified.

Figure 3A:
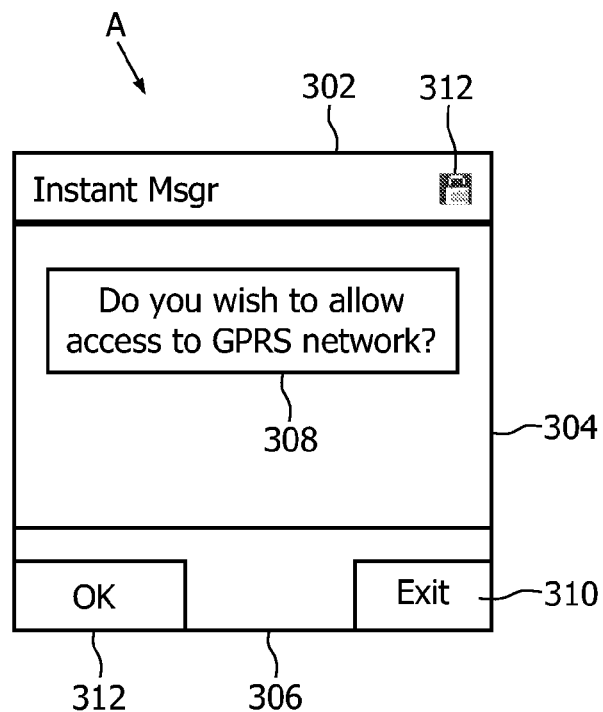
FIGS. 3a and 3b depict screenshots of a device display incorporating user indications for verifying a software application according to the method of FIG. 1.
Figure 3B:
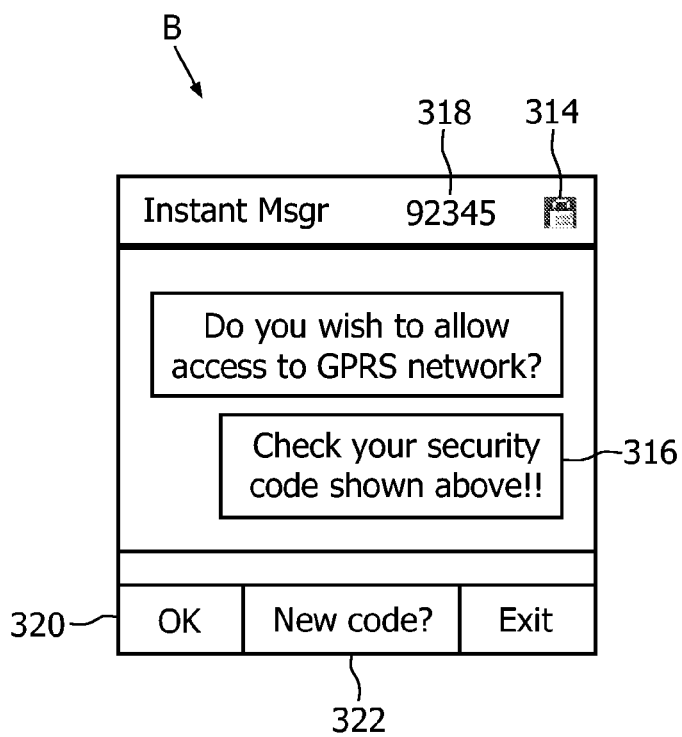

FIGS. 3a and 3b depict screenshots of a device display incorporating user indications for verifying a software application according to the method of the invention. The display A shown in FIG. 3a shows an example embodiment of the prior art and comprises three portions comprising a status bar 302, application area 304 and command bar 306. A received software application entitled "Instant Msgr" is currently executing on the device, as indicated by the title in the status bar 302. A further padlock icon 312 is also indicated in the status bar 302 suggesting to the user that the software application entitled "Instant Msgr" is a trusted application. As discussed above this may not necessarily be true. The application is prompting 308 the user to access a secured API (in the example, GPRS network access) of the Java ME environment. Should the user confirm access by selecting OK 312 on the command bar 306 then, for an application which is in fact untrusted, there is risk.

In contrast, display B shows, for the same received software application already described in relation to display A, in addition to the padlock icon 314, the secure code 318 in the status bar. The display prompts 316 the user to check the secure code 318. Once this check is made, the user can confirm access by selecting OK 320 on the command bar, confident that the application is verified.

Optionally, the user also has the ability to create a new secure code by selecting 'New code?' 322 in the command bar; if selected, a new secure code will be calculated by the trusted entity with, or without, the need for the user to enter a PIN, as already discussed above.

The foregoing method and implementations are presented by way of examples only and represent a selection of a range of methods and implementations that can readily be identified by a person skilled in the art to exploit the advantages of the present invention.

In the description above and with reference to FIG. 1, there is provided a method for verifying a software application to a user of a device such as a mobile phone. The device receives 102 the software application, for example a Java ME MIDlet, and checks 104 a signature associated with the software application. Where the signature is recognised, the phone indicates 108 this status to the user, for example by displaying the familiar padlock icon. The mobile phone then establishes 110 a secure code known only to the user and a trusted entity, the entity being for example the manager of the Java ME environment. The device identifies 114 the software application to the trusted entity which then checks 116 the status of the software application. If the status is verified, the entity sends 118 the status to the device; which in turn indicates 120 the secure code to the user, for example as an additional displayed number, pictogram or the like.

The invention claimed is:

1. A method for verifying a software application to a user of a device, comprising:
   receiving the software application;
   checking a signature associated with the received software application;
   where the checked signature is issued by a recognized authority, indicating this status to the user;
   establishing a secure code known only to the user and a trusted entity, wherein the secure code is based on user input, identifying the received software application to the trusted entity;
   checking the status of the identified software application by the trusted entity; and
   where the checked software application status is verified: sending the indicated status to the device; and indicating the secure code to the user after the trusted entity determines that the identified software application is a trusted application.

2. The method as claimed in claim 1, wherein the establishing step comprises: inputting a Personal Identification Number (PIN) code at the device; sending the PIN code to the trusted entity; calculating the secure code in dependence on the PIN code, the calculation being performed using a secure algorithm under control of the trusted entity;
   and sending the secure code to the device.

3. The method as claimed in claim 2, wherein the device is a mobile telephone and sending the secure code to the device is by means of a Short Message Service (SMS) message.

4. The method as claimed in claim 1, wherein the trusted entity manages a software operating environment of the device.

5. A system for verifying a software application, the system comprising:
   a user device;
   a software applications server;
   a trusted entity server;
   a first communications link operable to communicate with the software applications server;
   a second communications link operable to communicate with the trusted entity server; the user device further comprising: a processor, a display, a user interface, program memory, data memory and interfaces to connect to respective first and second communications links; the processor operable to receive the software application from the software applications server using the first communications link;
   check a signature associated with the received software application, where the checked signature is issued by a recognized authority, indicate this status to the user by means of the user interface or display; using the second communication link,
   establish a secure code known only to the user and the trusted entity, wherein the secure code is based on user input, and identify the received software application to the trusted entity;
   and indicate, by user interface or display, the secure code to the user where the status is verified;
   and the trusted entity server is operable to check the status of the received software application;
   and where the status is verified, send the status to the device.

6. A user device for use in the system as claimed in claim 5, wherein the device is a mobile telephone.

7. A user device for use in the system as claimed in claim 5, wherein the device operates under control of Java Micro Edition (ME) Java ME.

8. The user device as claimed in claim 6, wherein the device operates under control of Java Micro Edition (ME).

9. The method of claim 1, further comprising: indicating the secure code to the user as an audible report.

10. The method of claim 1, further comprising: indicating the secure code to the user as a number code.

11. The method of claim 1, further comprising: indicating the secure code to the user as an icon.

12. The method of claim 1, further comprising: indicating the secure code to the user as a pictogram.

13. The method of claim 1, wherein the secure code is unique to each user.

14. The method of claim 1, further comprising: displaying the secure code in a status bar.

15. The system of claim 5, wherein the indicated secure code is an audible report.

16. The system of claim 5, wherein the indicated secure code is a number code.

17. The system of claim 5, wherein the indicated secure code is an icon.

18. The system of claim 5, wherein the indicated secure code is a pictogram.

19. The system of claim 5, wherein the secure code is unique to each user.

20. The system of claim 5, wherein the secure code is displayed in a status bar.

* * * * *